US011898873B2

(12) United States Patent
Navin et al.

(10) Patent No.: US 11,898,873 B2
(45) Date of Patent: Feb. 13, 2024

(54) CALIBRATING MULTIPLE INERTIAL MEASUREMENT UNITS

(71) Applicant: Zoox, Inc., Foster City, CA (US)

(72) Inventors: Siddharth Ratapani Navin, Mountain View, CA (US); Derek Adams, Pasadena, CA (US); Michael Carsten Bosse, Cupertino, CA (US); Aleksandrs Ecins, San Mateo, CA (US)

(73) Assignee: ZOOX, INC., Foster City, CA (US)

( * ) Notice: Subject to any disclaimer, the term of this patent is extended or adjusted under 35 U.S.C. 154(b) by 338 days.

(21) Appl. No.: 17/463,027

(22) Filed: Aug. 31, 2021

(65) Prior Publication Data
US 2023/0066919 A1    Mar. 2, 2023

(51) Int. Cl.
*G01C 25/00*    (2006.01)
*G01P 15/08*    (2006.01)
(Continued)

(52) U.S. Cl.
CPC .......... *G01C 25/005* (2013.01); *B60W 30/02* (2013.01); *B60W 40/10* (2013.01); *B60W 50/0205* (2013.01); *B60W 50/06* (2013.01); *G01C 21/1652* (2020.08); *G01P 15/08* (2013.01); *B60W 2420/42* (2013.01); *B60W 2420/52* (2013.01); *B60W 2520/14* (2013.01); *B60W 2520/16* (2013.01); *B60W 2520/18* (2013.01)

(58) Field of Classification Search
CPC ... G01C 25/005; G01C 21/1652; G01P 15/08; B60W 30/02; B60W 40/10; B60W 50/0205; B60W 50/06; B60W 2420/42; B60W 2420/52; B60W 2520/14; B60W 2520/16; B60W 2520/18
See application file for complete search history.

(56) References Cited

U.S. PATENT DOCUMENTS 11,680,824 B1 *   6/2023   Navin ............... G01C 21/165
                                                    701/33.1
2014/0324291 A1   10/2014  Jones et al.
(Continued)

FOREIGN PATENT DOCUMENTS

CN    108731664 A    11/2018
CN    112577517 A    3/2021
(Continued)

OTHER PUBLICATIONS

The PCT Search Report and Written Opinion dated Dec. 20, 2022 for PCT application No. PCT/US2022/042067, 12 pages.

*Primary Examiner* — Peter D Nolan
*Assistant Examiner* — Wae L Louie
(74) *Attorney, Agent, or Firm* — Lee & Hayes, P.C.

(57) ABSTRACT

Systems and methods for calibrating multiple inertial measurement units on a system include calibrating a first of the inertial measurement units relative to the system using a first calibration model, and calibrating the remaining inertial measurement unit(s) relative to the first inertial measurement unit using a second calibration model. The calibration of the remaining inertial measurement unit(s) to the first inertial measurement unit can be based on a rigid body model by aligning a rotational velocity of the first inertial measurement unit with a rotational velocity of the remaining inertial measurement unit(s).

20 Claims, 5 Drawing Sheets

(51) Int. Cl.
*G01C 21/16* (2006.01)
*B60W 50/02* (2012.01)
*B60W 50/06* (2006.01)
*B60W 30/02* (2012.01)
*B60W 40/10* (2012.01)

(56) References Cited

U.S. PATENT DOCUMENTS

| | | | |
|---|---|---|---|
| 2016/0214742 A1* | 7/2016 | Carroll | G01C 21/1656 |
| 2020/0217873 A1* | 7/2020 | Jiang | G01P 21/00 |
| 2020/0348137 A1* | 11/2020 | Jain | G01C 25/005 |
| 2020/0386782 A1* | 12/2020 | Lee | G01P 21/00 |
| 2021/0284172 A1* | 9/2021 | Birkland | B60W 10/30 |
| 2021/0364652 A1* | 11/2021 | Spasovski | G01S 19/23 |
| 2022/0049961 A1* | 2/2022 | Omr | G01S 13/86 |
| 2022/0227380 A1* | 7/2022 | Griffith | G06T 7/80 |
| 2022/0252399 A1* | 8/2022 | Terao | G01P 21/00 |
| 2022/0299543 A1* | 9/2022 | Carlson | G01P 21/00 |
| 2023/0066919 A1* | 3/2023 | Navin | G01C 25/005 |
| 2023/0136325 A1* | 5/2023 | Bosse | B60W 40/105 |
| | | | 701/93 |
| 2023/0150518 A1* | 5/2023 | Zhao | G01S 7/4091 |
| | | | 701/1 |
| 2023/0186494 A1* | 6/2023 | Bosse | G06T 7/33 |
| | | | 345/424 |

FOREIGN PATENT DOCUMENTS

| | | | |
|---|---|---|---|
| EP | 2187170 A2 | 5/2010 | |
| KR | 20140030955 A | 3/2014 | |

\* cited by examiner

CALIBRATING MULTIPLE INERTIAL MEASUREMENT UNITS

BACKGROUND

Systems that rely on sensor data require accurate calibration of those sensors. For example, autonomous systems, such as autonomous vehicles, may have multiple sensors that capture data that can be used to determine information about the system, as well as information about an environment in which the system is operating. Generally, sensors are calibrated before being incorporated into a system. Some current calibration techniques use infrastructure, such as fiducial markers, to calibrate sensors. For example, by capturing data of a fiducial marker, a correction term can be determined and applied to subsequently-captured data. While the infrastructure may be readily available at a location at which a system is manufactured or at other locations, subsequent calibration requires bringing the system (e.g. the autonomous vehicle) to a location that has infrastructure, resulting in undesirable downtime for the system and/or, for those examples which rely on sensors for navigation, potentially unsafe travel to the location. Moreover, current techniques for calibrating sensors can be tedious, because, in most cases, only a single sensor can be calibrated at a given time. Existing calibration techniques that attempt to mitigate these drawbacks are often computationally expensive.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
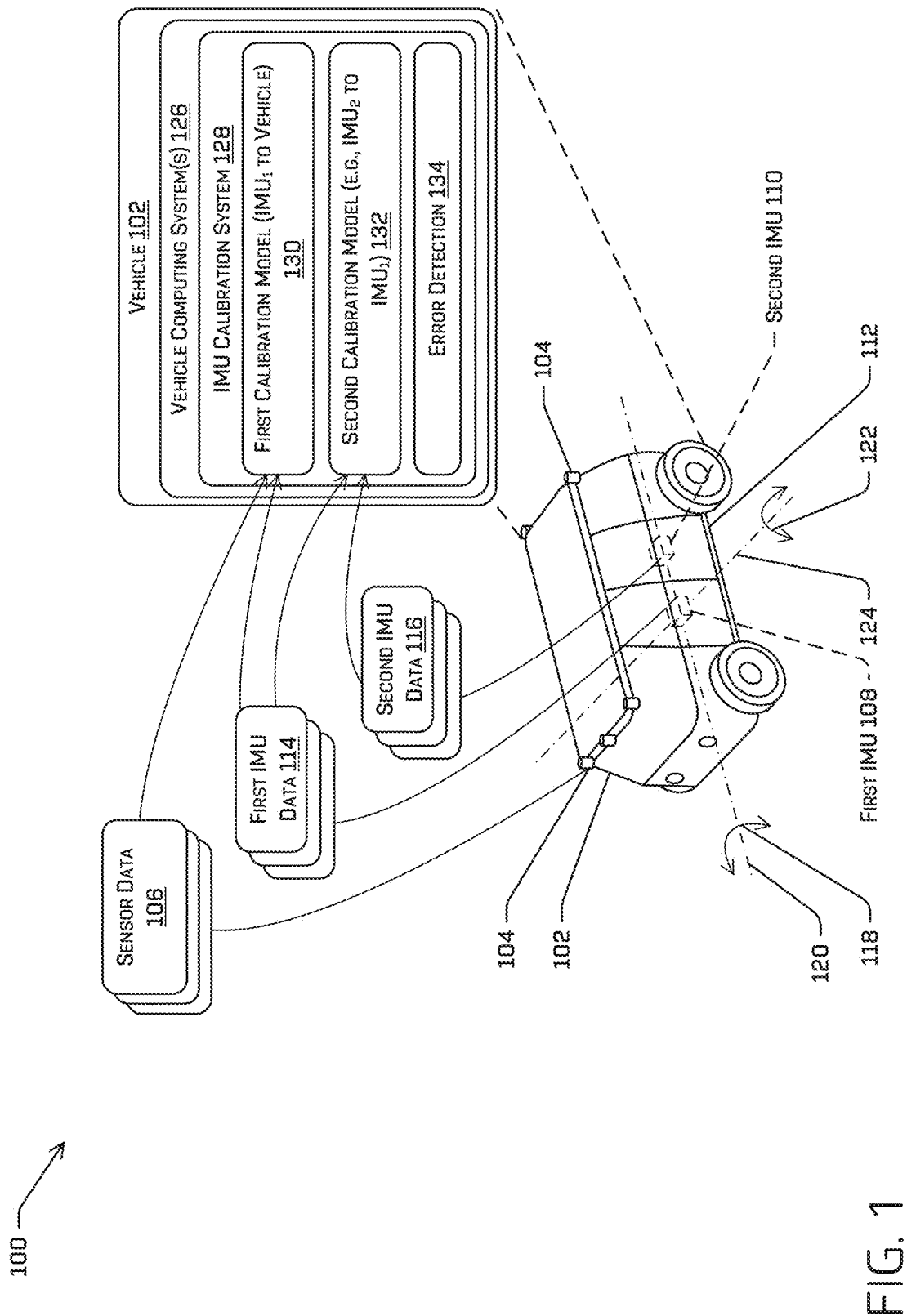
FIG. 1 is a schematic illustration showing an example vehicle, such as an autonomous vehicle, and example components and functionality of systems associated with the vehicle, as described herein.

Techniques described herein are directed to sensor calibration. In more detail, the disclosure relates to determining errors associated with inertial measurement units (IMUs) used in a system, such as an autonomous vehicle system. Throughout, such IMUs may comprise any one or more of accelerometers, gyroscopes, magnetometers, and the like. In examples, the techniques described herein can be used to calibrate IMUs and/or to validate IMU calibration. In general, aspects of this disclosure relate to "extrinsic" calibration (that is determining one or more of a location or orientation of the IMU relative to some origin, e.g., an origin of the system), although some aspects of the techniques described herein may be useful for "intrinsic" calibration (that is determining one or more parameters about the IMU itself). In the context of an autonomous vehicle, the techniques descried herein can be used to calibrate and/or validate calibration of multiple IMUs more quickly and/or with reduced processing requirements. When IMUs are correctly calibrated (e.g., with respect to each other, with respect to the vehicle, and/or internally), data from those IMUs can be combined to produce an aligned representation of the vehicle in an environment. However, when the IMUs are improperly calibrated, combining the sensor data may result in an inaccurate, or "blurry," representation of the vehicle. For instance, when IMUs on a vehicle are not calibrated properly, a pose of the vehicle may be incorrect, which may result in improper and potentially unsafe travel. While applicable to autonomous vehicle systems, aspects of this disclosure may be used in other systems that use sensors (e.g., robotic manipulators having one or more sensors/sensor modalities, and the like).

Vehicle sensors, including IMUs are typically calibrated before being installed in a vehicle to ensure they are functioning properly. However, current techniques for calibrating IMUs can be tedious because, in most cases, only a single sensor can be calibrated at a given time. Additionally, current techniques do not account for the specific use cases in which a sensor may be used, and additional calibration beyond simple bench-type testing may be necessary. Further, current calibration techniques do not allow for detection of sensor anomalies after installation or while in use, and in scenarios in which multiple sensors of the same type are in use, current techniques do not ensure that individual sensors are correctly calibrated relative to other sensors.

For instance, a vehicle may include multiple IMUs. When these IMUs are tested or calibrated before being installed in a vehicle, the extent of these tests may only determine whether a specific IMU has been manufactured properly and is operating within specifications. As such, these tests are not able to account for, among other things, whether an IMU is properly fixed to a mounting surface of a vehicle, whether a first IMU is properly scaled with respect to other IMUs, whether the first IMU is sheared compared to the other IMUs, faults that have occurred with respect to an IMU after it has been in service in a vehicle, dislodging or movement of the IMU during travel, and/or the like.

This application is directed to improved techniques for detecting faults associated with IMUs when multiple IMUs are attached to a single rigid body. For instance, when multiple IMUs are coupled to a rigid body (e.g., a vehicle), a rotation of a first IMU relative to one or more other IMUs may be estimated when the location/position of the IMUs relative to one another is known. This is because each IMU is attached to the same rigid body, so gyroscope measurements obtained from each of the IMUs should be approximately equal (e.g., the angular velocity measured by a first IMU should be approximately equal to the angular velocity measured by the one or more other IMUs). Techniques described herein use these rigid body kinematics to determine a first calibration for a first IMU, e.g., relative to the vehicle, and then use a relative rotation of one or more second IMUs to the first IMU to determine a calibration of the one or more second IMUs to the vehicle.

In implementations of this disclosure, a first IMU can be calibrated relative to a vehicle using a first model or technique. For example, the first model can align data from the first IMU with data from a sensor of a different modality, e.g., LiDAR or image data. Calibration using the first model may result in a first transformation that describes a relative position, e.g., a relative rotation, of the first IMU relative to the vehicle (or some point associated with the vehicle). In some conventional systems, each IMU may be calibrated independently using the first model. However, the first model may include a non-linear optimization, the implementation of which can be computationally expensive and/or time consuming.

Some implementations of this disclosure include implementing a second model or technique to determine a transformation between a second IMU and the first IMU aligned using sensor data. For example, using rigid body kinematics as discussed above, because the IMUs are expected to have a same rotational velocity about a given axis, the second model can determine a relative rotation of the second IMU relative to the first IMU. For example, the second model may implement a least squares estimation, which is less computationally expensive and/or time consuming than execution of the first model. Calibration of IMUs according to techniques described herein may require excitation of the IMUs about as many degrees of freedom as possible. For instance, a vehicle to which the IMUs are fixed may be controlled to corner, drive over potholes, drive over speed bumps, drive up and/or down hills, accelerate, decelerate, or the like.

The techniques described herein can determine a calibration of the second IMU relative to vehicle using the transformation determined using the first model or technique and the transformation determined using the second model or technique. For instance, the transformation determined using the first model represents a rotation of the first IMU relative to the vehicle and the transformation determined using the second model represents a rotation of the second IMU relative to the first IMU. Accordingly, the rotation of the second IMU relative to the vehicle can be determined, e.g., as a product of the two transformations.

As alluded to above, detecting IMU faults and/or calibrating IMUs according to the techniques described herein has several advantages not offered by prior techniques. For instance, by estimating a rotation of a first IMU relative to one or more other IMUs, it may be determined whether the first IMU or one of the other IMUs is properly fixed to a mounting surface (e.g., the IMU does not move independently of the rigid body it is coupled to). Additionally, by estimating rotations of multiple IMUs attached to the same rigid body, it may be determined whether the IMUs are properly scaled with respect to one another, whether an IMU is sheared with respect to the other IMUs, as well as whether faults have occurred after the IMUs have been in service. Further, the techniques disclosed allow for the testing, calibration, and validation of IMUs on vehicle (or in application) as opposed to bench-type testing. In other words, the disclosed techniques allow for IMUs to be tested under conditions that they will actually be used for in their real-world application. Other improvements not described will be easily apparent to those possessing ordinary skill in the art.

Calibration techniques discussed herein can improve the functioning of a computing device by providing a framework to determine and validate optimal calibration for sensors on an autonomous vehicle. By verifying calibration of one or more sensors using the calibration techniques described herein, the sensors can generate data representing an environment with a high degree of accuracy and precision about the environment. For example, sensors that have been calibrated and/or verified in this manner can provide more accurate data for segmentation, classification, route planning, etc., which can ultimately lead to better safety outcomes while driving. Furthermore, such improved calibration for sensors may improve processing and perception systems, for example, by providing more accurate starting points and better fused data for segmentation, classification, etc. These and other improvements to the functioning of a computing device are discussed.

The calibration techniques discussed herein also represent improvements over conventional calibration. For example, in the past, calibration techniques often required extensive infrastructure. For example, some techniques have included mounting a vehicle on a turntable and physically turning the vehicle while monitoring the data captured by sensors on the vehicle. Such conventional calibration techniques suffer from limited flexibility, often require additional and/or specialized calibration equipment, and/or result in a suboptimal calibration. In contrast, the techniques described herein may allow for infrastructure-free calibration. For example, techniques described herein may be able to automatically adjust for changes in calibration as a vehicle traverses through an environment, e.g., by considering new data as it is recorded. Moreover, the techniques described herein can be used to verify calibration sensors, e.g., by detecting miscalibration in near real time. Thus, the techniques discussed herein represent significant improvement over conventional calibration.

The methods, apparatuses and systems described herein can be implemented in a number of ways. Example implementations are provided below with reference to the following figures. Although discussed in the context of an autonomous vehicle, the methods, apparatuses, and systems described herein can be applied to a variety of systems requiring calibration of sensors prior to and/or during use and are not limited to autonomous vehicles. In another example, the methods, apparatuses, and systems may be utilized in an aviation context.

FIGS. 1-5 provide additional details associated with the techniques described herein.

FIG. 1 illustrates an example environment 100 in which an example vehicle 102 is located. The example vehicle 102 can be a driverless vehicle, such as an autonomous vehicle configured to operate according to a Level 5 classification issued by the U.S. National Highway Traffic Safety Administration. The Level 5 classification describes a vehicle capable of performing all safety-critical functions for an entire trip, with the driver (or occupant) not being expected to control the vehicle at any time. In such examples, because the vehicle 102 can be configured to control all functions from start to completion of the trip, including all parking functions, the vehicle may not include a driver and/or controls for manual driving, such as a steering wheel, an acceleration pedal, and/or a brake pedal. This is merely an example, and the systems and methods described herein may be incorporated into any ground-borne, airborne, or waterborne vehicle, including those ranging from vehicles that need to be manually controlled by a driver at all times, to those that are partially or fully autonomously controlled.

The example vehicle 102 can be any configuration of vehicle, such as, for example, a van, a sport utility vehicle, a cross-over vehicle, a truck, a bus, an agricultural vehicle, and/or a construction vehicle. The vehicle 102 can be powered by one or more internal combustion engines, one or more electric motors, hydrogen power, any combination thereof, and/or any other suitable power source(s). Although the example vehicle 102 has four wheels, the systems and methods described herein can be incorporated into vehicles having fewer or a greater number of wheels, tires, and/or tracks. The example vehicle 102 can have four-wheel steering and can operate generally with equal performance characteristics in all directions. For instance, the vehicle 102 may be configured such that a first end of the vehicle 102 is the front end of the vehicle 102, and an opposite, second end of the vehicle 102 is the rear end when traveling in a first direction, and such that the first end becomes the rear end of the vehicle 102 and the second end of the vehicle 102 becomes the front end of the vehicle 102 when traveling in the opposite direction. Stated differently, the vehicle 102 may be a bi-directional vehicle capable of travelling forward in either of opposite directions. These example characteristics may facilitate greater maneuverability, for example, in small spaces or crowded environments, such as parking lots and/or urban areas.

The vehicle 102 can include one or more sensor systems. For example, the vehicle 102 can include one or more sensors 104 disposed thereon (two of which are labelled) for generating data about the environment 100. The sensor(s) 104 may be fixed to the vehicle 102 and relative to other of the sensor(s) 104, and aspects of the sensor(s) 104 may be calibrated relative to each other and/or relative to the vehicle. In some instances, the sensor(s) 104 may be arranged to provide 360-degrees of coverage around the vehicle 102. Different of the sensor(s) 104 may have overlapping fields of view, e.g., to provide redundancy of information. The sensor(s) 104 can be, for example, one or more time-of-flight sensors, LiDAR sensors, RADAR sensors, SONAR sensors, image sensors, audio sensors, infrared sensors, location sensors, or the like, or any combination thereof. In the illustrated example, the sensor system(s) 104 generate sensor data 106 associated with the environment. The sensor data 106 may be any data type or data format. For instance, when the sensor(s) 104 include an image sensor, the sensor data 106 may be one or more image frames, when the sensor(s) 104 include a LiDAR sensor, the sensor data 106 may be point clouds associated with LiDAR scans, and so forth. In some implementations, the sensor data 106 may be processed by a vehicle control system to identify and/or classify objects in the environment 100, e.g., trees, vehicles, pedestrians, buildings, road surfaces, signage, barriers, road marking, or the like and/or to navigate the vehicle 102 relative to such object(s).

The vehicle 102 can also include one or more sensor systems for generating data about the vehicle. For instance, FIG. 1 illustrates a first inertial measurement unit (IMU) 108 and a second IMU 110. The first IMU 108 and the second IMU 110 may be disposed on a frame or chassis 112 of the vehicle 102, e.g., such that the IMU 108 is fixed relative to the chassis 112. In other examples, the first IMU 108 and the second IMU 110 may be disposed on a single mounting structure, e.g., a circuit board, fixed relative to the chassis 112. In the illustrated example, the first IMU 108 and the second IMU 110 are fixed relative to each other, and relative to the vehicle 102. In some examples, each of the first IMU 108 and the second IMU 110 may include one or more gyroscopes, accelerometers, magnetometers, and the like. For instance, the first IMU 108 and the second IMU 110 may include a gyroscope, accelerometer, and magnetometer for each of the three principal axes (e.g., roll, pitch, and yaw or x, y, z, etc.). Although only the first IMU 108 and the second IMU 110 are illustrated in FIG. 1, aspects of this disclosure are applicable to systems that include more than two IMUs. For instance, some example autonomous vehicle systems may have four or more IMUs. The techniques described herein can reduce the time and processing requirements necessary to calibrate a plurality of IMUs, and the time and processing reductions may be linear for each additional IMU beyond the second IMU 110.

The first IMU 108 generates first IMU data 114, and the second IMU 110 generates second IMU data 116. For instance, the first IMU 108 and the second IMU 110 can include one or more gyroscopes and/or accelerometers used to determine angular rates and/or body accelerations, respectively. The first IMU data 114 and the second IMU data 116 can thus include rotational and/or translational information about and/or along one or more axes. In some implementations of this disclosure, the first IMU 108 and the second IMU can be used to measure rotational changes of the vehicle 102 resulting from induced motion of the vehicle 102. In some instances, the induced motion can result from driving of the vehicle 102 in the environment 100 in a manner that causes rotational and/or translational motion about a number of degrees of freedom. Without limitation, the vehicle 102 can be controlled according to a predefined path or trajectory including turns or cornering, movement up and/or down hills, movement over bumps, potholes, or the like. In the example, the first IMU 108 may be configured to determine first rotational motion (illustrated in FIG. 1 by first arrows 118) about a first axis 120 and/or to determine second rotational motion (illustrated in FIG. 1 by second arrows 122) about a second axis 124. In the illustrated example, the first axis 120 may be perpendicular to the second axis 124. Although not required, the first axis 120 may generally align with (e.g., be parallel to or coincident with) a longitudinal axis of the vehicle 102, and/or the second axis 124 may generally align with (e.g., be parallel to or coincident with) a lateral axis of the vehicle 102. As noted, because the first IMU 108 is fixed relative to the vehicle 102, e.g., the chassis 112 of the vehicle 102, the first IMU data 114 generated by the IMU 108 can include information about a rotation of the chassis 110/vehicle 102 about the first axis 120 and/or the second axis 124. Although not illustrated in FIG. 1, the first IMU 108 may also generate information about a rotation of the vehicle about a vertical axis, e.g., an axis perpendicular to both the first axis 120 and the second axis 124. Stated differently, the first IMU 108 may be disposed to generate information about one or more of a roll, pitch, and/or yaw of the vehicle 102.

The second IMU 110 is similarly configured to determine information, e.g., as the second IMU data 116, associated with rotation about and/or acceleration along one or more axes. In the example of FIG. 1, the second IMU 110 is also disposed one the first axis 120, e.g., at a position spaced from the first IMU 108, and thus may be expected to determine a same rotational velocity about the first axis 120. In this example, the second IMU 110 may be disposed, e.g., on the chassis 112, a circuit board, or other mounting structure, at a fixed distance from the first IMU 108 along the first axis 120. The second IMU 110 may experience a rotation about a second lateral axis, spaced from the axis 124. In other examples, the second IMU 110 may be other than on the same axis as the first IMU 108. Without limitation, the second IMU 110 may be spaced translationally and/or rotationally from the first IMU 108. As noted above, the first IMU 108 and the second IMU 110 are fixed relative to each other and relative to the chassis 112 such that during normal operation of the vehicle 102, data from the first IMU 108 and from the second IMU 110 have a known relationship, e.g., according to the design of the vehicle 102.

In conventional systems, the first IMU 108 and the second IMU 110 are calibrated independently. For instance, every IMU on the vehicle may be calibrated based on sensed rotation and/or translation, as well as sensor data such as the sensor data 106. As noted above, individually calibrating each IMU on the vehicle requires a relatively large amount of time and/or processing power. In examples of this disclosure, however, the vehicle 102 includes one or more vehicle computing system(s) 126 that implement an IMU calibration system 128. The IMU calibration system 128 facilitates calibration of IMUs without the need for the time-consuming and expensive conventional processes. The IMU calibration system 128 may be configured to receive the sensor data 106, the first IMU data 114, and the second IMU data 116 and determine, based at least in part on the data, whether the first IMU 108 and/or the second IMU 110 is/are functioning properly. More specifically, the IMU calibration system 128 includes a first calibration model 130, a second calibration model 132, and an error detection component 134.

The first calibration model 130 is a model or technique that calibrates the first IMU 108, e.g., relative to the vehicle 102. In examples, the first calibration model 130 receives the sensor data 106 and the first IMU data 114 to calibrate the first IMU 108 relative to the vehicle 102. In some examples, the first calibration model 130 may implement a least-squares optimization that estimates extrinsics (e.g., position, pose) of the first IMU 108 based on LiDAR data as the sensor data 108. In such examples, relative motion of the vehicle may be determined based on observations of LIDAR data and used to compare (and/or combine) with the IMU data to determine a relative orientation and/or position of the IMU such that IMU data corresponds to such relative motion. For example, the first calibration model 130 may be implemented using a sensor fusion library, such as the GTSAM library. In some examples, the first calibration model 130 can be any other conventional model that calibrates the first IMU 108 relative to the vehicle 102. For example, the first calibration model 130 can determine a transformation of the IMU to some fixed point or position on the vehicle 102.

In some conventional systems, the first calibration model 130 may be used to calibrate each of the first IMU 108 and the second IMU 110 (and any additional or other IMUs) using the sensor data 108. However, as noted above, such calibration is time-consuming and computationally expensive. Often, because of the computational resources required, multiple IMUs must be calibrated serially, further increasing an overall time to calibrate the IMUs. The IMU calibration system 128 reduces calibration time and resource requirements by implementing the second calibration model 132. As detailed further herein, the second calibration model 132 calibrates the second IMU 110 relative to the first IMU 108, which has already been calibrated to the vehicle 102 using the first calibration model 130. For example, because the second IMU 110 has a fixed and known position relative to the first IMU 108, the second calibration model 132 may be a simplified model or technique based on an assumption that the first IMU 108 and the second IMU (as well as another additional IMUs) form a rigid body. According to rigid body kinematics, all points on the rigid body have the same angular velocity and the same angular acceleration given an axis of rotation. Thus, in the context of the vehicle 102, when properly calibrated, a gyroscope associated with the first IMU 108 should read the same angular velocity as a gyroscope associated with the second IMU 110, relative to the axis.

The second calibration model 132, using the rigid body kinematics, can determine a relative rotation of the second IMU 110 relative to the first IMU 108. For example, the second calibration model 132 can implement a least squares algorithm to determine a transformation that aligns the first IMU data 114 with the second IMU data 116. In some examples, the second calibration model 132 may determine a rotation matrix, e.g., using the Kabsch algorithm. For instance, the second calibration model 132 may minimize a deviation (e.g., a difference, difference of squares, square of differences, etc.) between the first IMU data 114 and the second IMU data 116. Other example algorithms can use other loss functions and/or minimize different costs. Without limitation, an example may minimize function of an error or deviation between the first IMU data 114 and the second IMU data 116. In examples, because the first calibration model 130 determined a transformation of the first IMU 108 relative to the vehicle 102, the aligned second IMU data 116 can also be calibrated to the vehicle, e.g., using the transformation. The second calibration model 132 can also use additional information to determine the transformation. For example, the first IMU 108 and the second IMU 110 may have inherent biases, and the second calibration model 132 can determine a bias term based thereon. In some examples, offsets, errors, and the like may be determined as part of any such optimization. Moreover, as noted above, the second calibration model 132 may determine only a rotational matrix, e.g., based on the gyroscope information. Translation between the first IMU 108 and the second IMU 110 may be based solely on a specification of the vehicle. As noted above, the first IMU 108 and the second IMU 110 are disposed at fixed positions with known linear distances therebetween. In examples, the second calibration model 132 can receive the specification information and determine the transformation based at least in part on such information. In other examples, the second calibration model 132 can use information from accelerometers associated with the first IMU 108 and the second IMU 110 to determine a translation between the first IMU data 114 and the second IMU data 116.

As will be appreciated, the second calibration model 132 uses the first IMU data 114 and the second IMU data 116 to determine a transformation between the first IMU 108 and the second IMU 110 to calibrate the second IMU 110 relative to the vehicle 102. The second calibration model 132 can determine the transformation between the second IMU data 116 and the first IMU data 114 without the sensor data 108, e.g., at the exclusion of the sensor data 106. In examples, the second calibration model 132 executes more quickly (in some instances significantly more quickly) and with fewer computational resources. Accordingly, because the first calibration model 130 has been used to calibrate the first IMU 108, and the second calibration model 132 has been used to determine a transformation between the first IMU 108 and the second IMU 110, the relationship of the second IMU 110 to the vehicle can be determined. Thus, the second IMU 110 (and other IMUs) can be aligned with the vehicle the results of the first calibration model 130, but without the need to consider each of the IMUs using the first calibration model 130, as in previous systems.

As illustrated in FIG. 1, the IMU calibration system 128 also includes the error detection component 134. Conceptually, the error detection component 134 can determine whether an IMU is properly calibrated, based on outputs of the first calibration model 130 and/or the second calibration model 132. For instance, the error detection component 134 can determine that the first IMU 108 is properly calibrated if the results of the first calibration model 130 determine that the first IMU data 114 aligns, within a threshold, with the sensor data 106. In other examples, the error detection component 134, using the outputs of the first calibration model 130 and the second calibration model 132, may determine that the second IMU data 116 is properly calibrated if the second IMU data 116 aligns with the vehicle 102. Similarly, the error detection component 134 may be configured to determine that the second IMU data 116 indicates that the second IMU 110 is not calibrated relative to the vehicle 102, e.g., based on the calibration of the first IMU 108 relative to the vehicle 102. In some instances, the error detection component 134 can generate, e.g., quantify, an error based on a comparison of the second IMU data 116 to an expectation based on the results of the second calibration model 132 and the first calibration model 130. When the error detection component 134 determines that the error is less than a threshold error, the IMU calibration system 128 can indicate the second IMU 110 and/or the second IMU data 116 is/are reliable. Alternatively, when the error meets or exceeds the threshold error, the IMU calibration system 128 can indicate that the second IMU 110 and/or the second IMU data 116 is/are unreliable. When the second IMU 110 and/or the second IMU data 116 is/are unreliable, the IMU calibration system 128 can alert the vehicle computing system(s) 126 and/or other control systems to the malfunctioning sensor(s), and the vehicle 102 can be controlled accordingly. As non-limiting examples, the vehicle may respond by moving into a safe state, by continuing to operate at the exclusion of all IMU data except for data from the first IMU 108, by relatively weighting contributions of the other IMUs based at least in part on the relative errors with respect to the first IMU 108, and/or by recalibrating all of the IMUs using a more computationally intensive algorithm.

As described, once the first IMU 108 is calibrated relative to the vehicle using the first calibration model 130, the second IMU 110 and any additional IMUs can be calibrated to the vehicle, using the second calibration model 132 and the result of the first calibration model. The IMU calibration system 128 can validate the first IMU 108, the second IMU 110, and/or any other IMUs based on the known physical relationship between the IMUs. In examples, the sensor data 106, the first IMU data 114, and the second IMU data 116 include data generated over one or more time frames and during excitation of the chassis 112 of the vehicle 102. The excitation may result from operation or other manipulation of the vehicle in a manner that causes rotation and/or translation about a number of degrees-of-freedom. In some instances, the first calibration model 130 can consider data logs over one or more time periods. As will be appreciated, the second calibration 132 can then be used to determine the relative rotation (and translation) of the second IMU 110 an/or other IMUs based on IMU data over the same time periods. In examples, once the first IMU 108 is calibrated, other IMUs on the vehicle 102 can be calibrated independently, e.g., serially or in parallel, such that the techniques described herein can be used to identify a faulty or improperly aligned sensor. By isolating a malfunctioning or misaligned sensor, IMU data from only that malfunctioning IMU may be disregarded, which may allow the vehicle 102 to continue to operate in an altered state. As would be appreciated, the processes described herein may be run while the vehicle is operating as well. In at least some such examples, the calibration processes may be triggered during those portions of a route which have sufficient curvature in one or more axes.

As noted above, a benefit of the techniques described herein may be that the validation can be performed using less time and fewer resources. For example, the time to compute the least-squares optimization as the second calibration model 132 is significantly less processor-intensive and so can be performed more quickly and/or with fewer resources. As a result, downtime for the vehicle can be reduced.

Figure 2:
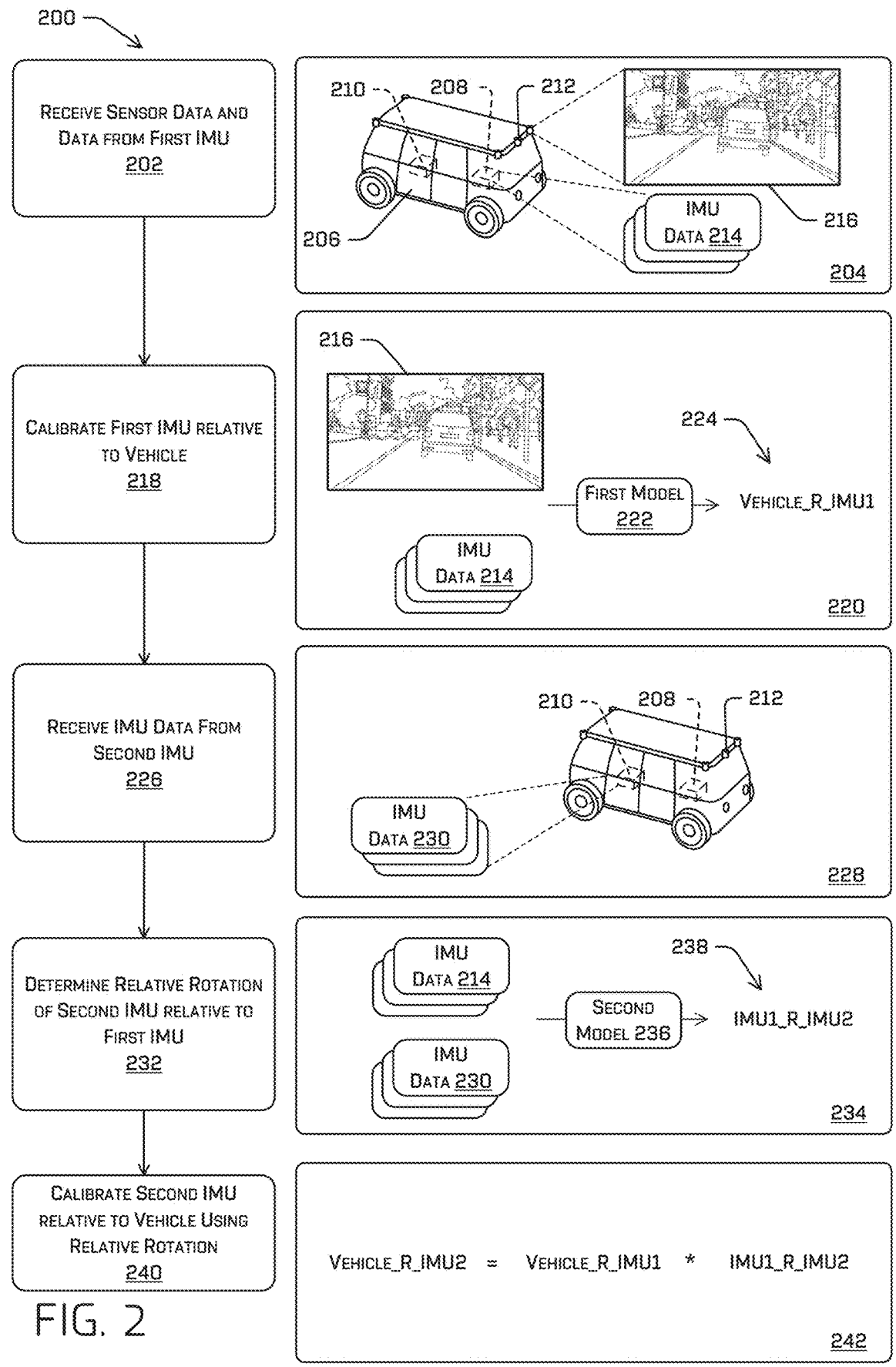
FIG. 2 includes textual and visual flowcharts to illustrate an example method for determining calibration errors in a sensor mounted on an autonomous vehicle, as described herein.

FIG. 2 is a pictorial flow diagram illustrating an example process 200 in which multiple inertial measurement units (IMUs) capture data associated with a vehicle traversing an environment, and that data is used to calibrate the IMUs.

At an operation 202, the process 200 includes receiving sensor data and data from a first IMU. In an example 204 accompanying the operation 202, a vehicle 206, which may be the vehicle 102 discussed above, is traversing through an environment. The vehicle 206 includes a first IMU 208, which may correspond to the first IMU 108 discussed above, a second IMU 210, which may correspond to the second IMU 110 discussed above, and one or more sensors 212, which may correspond to the sensors 104 discussed above. In the example 204, the first IMU generates IMU data 214 and the sensor(s) 212 generate sensor data 216. In some examples, the first IMU 208 and the second IMU 210 may include one or more gyroscopes, accelerometers, magnetometers, and the like. For instance, an individual IMU sensor 102 may include a gyroscope, accelerometer, and magnetometer for each of the three principal axes (e.g., roll, pitch, and yaw) and may generate data associated with a rotation and rotational rate, a translational acceleration and/or velocity, and/or a directional heading. In the example 204, the sensor data 216 may be image data, LiDAR data, radar data and/or other data generated by one or more of the sensor(s) 212, which are not IMUs. In examples, the vehicle 206 may receive driving instructions (e.g., a route) to traverse the environment, and the IMU data 214 and the sensor data 216 may be generated as the vehicle executes the driving instructions. The driving instructions may cause the vehicle 106 to navigate a route that includes a variety of turns, stops, starts, hill climbs, descents, speed bumps, and the like. Such a route may ensure that the first IMU 208 and the second IMU 210 capture data, including the IMU data 214 associated with a variety of movements of the vehicle 206.

At an operation 218, the process 200 includes calibrating the first IMU relative to the vehicle. In an example 220 accompanying the operation 218, the sensor data 216 and the IMU data 214 are provided to a first model 222. The first model 222 is a first calibration model that determines a calibration of the first IMU 208. For example, the first model 222 can implement a non-linear optimization or a factor graph estimation to estimate the extrinsics or position of the first IMU 208 relative to the vehicle 204, e.g., relative to a center of the vehicle 204. In examples, the first model 222 may also estimate the trajectory of the first IMU 208 in the log of data. The first model 222 is a robust estimation model that may compute transformations between poses using an algorithm to align the sensor data 216 between timestamps. By calibrating the first IMU 208 relative to the sensor data 216, the first model 222 determines the position of the first IMU 208. As shown in the example 220, the first model 222 provides a transformation between the first IMU 208 and some reference on the vehicle frame, shown as VEHICLE_R_IMU$_1$. More specifically, the term VEHICLE_R_IMU$_1$ is a rotational representation 224 of the first IMU 208 relative to the vehicle 206. The first IMU 208 may be selected at random from all IMUs on the vehicle. In other examples, the highest quality IMU of all IMUs on the vehicle, e.g., based on a measurement noise metric, a bias stability metric, or other metric, may be selected as the first IMU 208.

At an operation 226, the process 200 includes receiving IMU data from a second IMU. As shown in the example 228 accompanying the operation 226, the second IMU 210 generates IMU data 230. The IMU data 230 is data generated by the second IMU 210 that corresponds, e.g., in time, to the IMU data 214 and the sensor data 216. Stated differently, the IMU data 230 is generated in response to the same excitations and vehicle movements as the IMU data 214 and the sensor data 216. The IMU data 230 can include rotational data, a rate of rotation, angular velocities and/or accelerations, and/or other data generated by conventional IMUs.

At an operation 232, the process 200 includes determining a relative rotation of the second IMU relative to the first IMU. As described herein, because the first IMU 208 and the second IMU 210 are fixed relative to each and relative to the vehicle 204, the vehicle 204 and IMUs 208, 210 can be modeled as a rigid body. Accordingly, each IMU on the rigid body should report the same angular velocity about an axis. Of course, the actual angular velocity reported by the first IMU 208 may be different than the actual angular velocity reported by the second IMU 210 at the same time because of the relative positions of the first IMU 208 and the second IMU 210 on the vehicle 204. The operation 232 includes determining the rotation between the first IMU 208 and the second IMU 210 that aligns the angular velocities of the first IMU 208 and the second IMU 210. For example, the operation 232 can include Equation (1):

$$w_{IMU1} = IMU_1\_R\_IMU_2 * w_{IMU2} + b_x \qquad (1)$$

in which $w_{IMU1}$ is the angular velocity reported by the first IMU 208, $IMU_1\_R\_IMU_2$ is the rotation of the second IMU 210 in the frame of the first IMU 208, $w_{IMU2}$ is the angular velocity reported by the second IMU 210, and $b_x$ is a bias term, which may be the bias of the second IMU 210 relative to the first IMU 208.

As illustrated in an example 234 accompanying the operation 232, the IMU data 214 from the first IMU 208 and the IMU data 230 from the second IMU 210 are input into a second model 236 that determines the relative rotation of the second IMU 210 in the frame of the first IMU 208. That is, the second model 236 determines the $IMU_1\_R\_IMU_2$ term as a rotational representation 238. In some examples, the second model 236 can implement an ordinary least squares estimation to determine the $IMU_1\_R\_IMU_2$ term and the bias term. Conceptually, the estimation determines the relative rotation and the bias that aligns, on a timestamp by timestamp basis, the IMU data 214 from the first IMU 208 and the IMU data 230 from the second IMU 210. In some examples, the second model 236 can use a singular value decomposition method, e.g., as implemented by the Kabsch algorithm, although other methods and/or optimization algorithms can also be used to determine the relative rotation $IMU_1\_R\_IMU_2$. Without limitation, the second model 236 may alternatively include a least squares solver to determine each of nine components of a rotation matrix and three bias terms to generate a relative rotation matrix. The second model 236 may provide a deterministic answer, and requires reduced resources compared to a nonlinear optimization, such as may be implemented by the first model 222.

At an operation 240, the process 200 includes calibrating the second IMU relative to the vehicle using the relative rotation. Specifically, an example 242 accompanying the operation 240 illustrates equation (2) for determining a relative rotation of the second IMU 210 relative to the vehicle 206. Specifically, Equation (2) recites:

$$VEHICLE\_R\_IMU_2 = VEHICLE\_R\_IMU_1 * IMU_1\_R\_IMU_2 \qquad (2)$$

Specifically, according to Equation (2), a rotation of the second IMU 210 relative to the vehicle 206 is the product of the rotational representation 224 (e.g., VEHICLE_R_IMU$_1$) and the rotational representation 238 (e.g., IMU$_1$_R_IMU$_2$). As detailed herein, the first rotational representation 224 is determined using the first model 222, and the second rotational representation 238 is determined using the second model 236. Determining the relative rotation of the second IMU 210 relative to the vehicle 206 using Equation (2) can determine whether the second IMU is properly calibrated. For example, if the relative rotation corresponds to or is within a threshold of an expected relative rotation, e.g., based on technical specifications of the vehicle 206, the second IMU 210 may be determined to be properly calibrated. However, if the relative rotation is outside the threshold, the second IMU 210 may be miscalibrated or otherwise malfunctioning.

Although the process 200 shows an example in which the vehicle includes only two IMUs, additional IMUs can be calibrated in the same manner as the second IMU 210. Specifically, the operations 226, 232, and 240 can be repeated for any number of additional IMUs. Because second model 236 requires only IMU data, e.g., instead of the sensor data 216, the operations 232 and 240 can be performed more quickly and using less processor load. For instance, any number of second IMUs can be calibrated independently, e.g., serially or in parallel. In still further examples, techniques described herein may determine the second rotational representation 238 for each pair of IMUs (e.g., the first IMU 208 and an additional IMU) and use all of those transformation, e.g., in a post graph optimization, to determine an optimized alignment of all the IMUs.

In the example of FIG. 2, the process 200 calibrates only for rotation. The bias term $b_x$ in the Equation (1) may correspond to biases associated with the first IMU 208 and the second IMU 210, but in examples discussed below, the bias term may be a nuisance term that is calculated by the second model and not used in the calibration. For instance, the translation can be determined using specifications of the vehicle 204, e.g., according to positions, locations, and expected tolerances or the like. In other examples, linear data in the IMU data, e.g., from accelerometers on the IMUs, can be used to calibrate for translation. For example, the algorithms used herein can be extended to calibrate translations between the first IMU 208 and the second IMU 210. Specifically, using rigid body kinematics, the accelerations measured by two IMUs, at two points, e.g., a first point associated with the first IMU 208 and a second point associated with the second IMU 210, can be used to estimate a relative translation using a least squares approach. Specifically, linear accelerations measured by the second IMU 210 can be aligned to a frame of the primary IMU using the relative rotation estimated as described above. For example, the three degrees-of-freedom relative translation of the secondary IMU relative to the primary IMU can be determined using measured accelerations and Equation (3):

$$a_{IMU2} = a_{IMU1} + \alpha_{IMU1} * IMU_1\_tx\_IMU_2 + w_{IMU1} * (w_{IMU1} * IMU_1\_tx\_IMU_2) \qquad (3)$$

In Equation (3), $a_{IMU2}$ is the acceleration measured by the second IMU 210 aligned to the frame of the first IMU 208 using the relative rotation estimated as described above, and $a_{IMU1}$ is the acceleration measured by the first IMU 208. Also in Equation (3), $\alpha_{IMU1}$ is a rotational acceleration computed at each sample point as the change in angular velocity, e.g., $\Delta w_{IMU1}$, divided by a fixed time window, e.g., $\Delta t$. Also in Equation (3), $IMU_1\_tx\_IMU_2$ is the three degreeof-freedom relative translation of the secondary IMU relative to the primary IMU (3) that can be estimated using a least squares approach.

Figure 3:
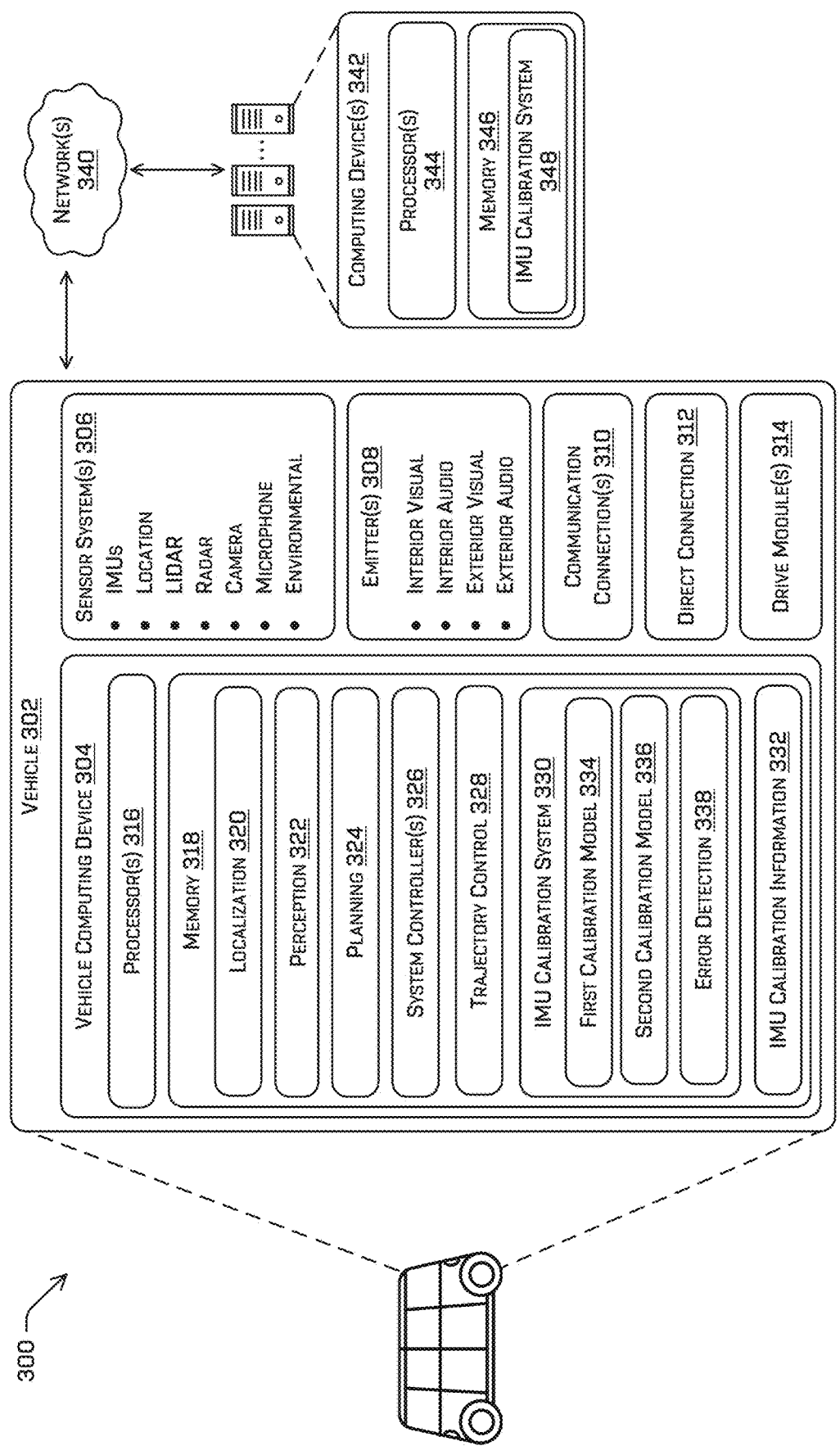
FIG. 3 is a block diagram of an example system for implementing embodiments of determining calibration errors, as described herein.

FIG. 3 illustrates a block diagram of an example system 300 for implementing the techniques described herein. In at least one example, the system 300 can include a vehicle 302, which can be the same vehicle as the vehicle 102 or the vehicle 206 described above with reference to FIGS. 1 and 2, respectively.

The vehicle 302 can include a vehicle computing device 304, one or more sensor systems 306, one or more emitters 308, one or more communication connections 310, at least one direct connection 312, and one or more drive modules 314.

The vehicle computing device 304 can include one or more processors 316 and memory 318 communicatively coupled with the processor(s) 316. In the illustrated example, the vehicle 302 is an autonomous vehicle; however, the vehicle 302 can be any other type of vehicle. In the illustrated example, the memory 318 of the vehicle computing device 304 stores a localization component 320, a perception component 322, a planning component 324, one or more system controllers 326, a trajectory control system 328, an IMU calibration system 330, and sensor calibration information 332. Further, the IMU calibration system 330 can include a first calibration model 334, a second calibration model 336, and an error detection component 338. Though depicted in FIG. 3 as residing in the memory 318 for illustrative purposes, it is contemplated that certain components, including but not limited to the IMU calibration system 330 and the sensor calibration information 332, may additionally, or alternatively, be accessible to the vehicle 302 (e.g., stored remotely).

In at least one example, the localization component 320 can include functionality to receive data from the sensor system(s) 306 to determine a position of the vehicle 302. For example, the localization component 320 can include, request, and/or receive a three-dimensional map of an environment and can continuously determine a location of the autonomous vehicle within the map. In some instances, the localization component 320 can utilize SLAM (simultaneous localization and mapping) or CLAMS (calibration, localization and mapping, simultaneously) to receive image data, LIDAR data, radar data, SONAR data, IMU data, (global positioning system) GPS data, wheel encoder data, and/or the like to accurately determine a location of the vehicle 302. In some instances, the localization component 320 can provide data to various components of the vehicle 302 to determine an initial position of the vehicle 302 for generating a candidate trajectory, or for correlating calibration operations, as discussed herein. In the context of this disclosure, in some instances, functionality associated with the localization component 320 may be used to calculate a pose or position information of the vehicle 302 when motion is induced at the vehicle, as described herein. For instance, the localization component 320 can receive information from an IMU and determine a pose or position of the vehicle 302 relative to a previous pose or position. Such poses may be independent of the environment in which the vehicle 302 is operating, but instead relative to each other.

In some instances, the perception component 322 can include functionality to perform object detection, segmentation, and/or classification. In some examples, the perception component 322 can provide processed sensor data that indicates a presence of an entity that is proximate to the vehicle 302 and/or a classification of the entity as an entity type (e.g., car, pedestrian, cyclist, animal, unknown, etc.). In additional and/or alternative examples, the perception component 322 can provide processed sensor data that indicates one or more characteristics associated with a detected entity and/or the environment in which the entity is positioned. In some examples, characteristics associated with an entity can include, but are not limited to, an x-position (global position), a y-position (global position), a z-position (global position), an orientation, an entity type (e.g., a classification), a velocity of the entity, an extent of the entity (e.g., size), etc. Characteristics associated with the environment can include, but are not limited to, a presence of another entity in the environment, a state of another entity in the environment, a time of day, a day of a week, a season, a weather condition, an indication of darkness/light, etc. In aspects of this disclosure, information from the perception component 322 may be used to identify features in sensor data. For instance, semantic segmentation information may be used to identify objects that can be compared between instances of sensor data.

In general, the planning component 324 can determine a path for the vehicle 302 to follow to traverse through an environment. For example, the planning component 324 can determine various routes and trajectories and various levels of detail. For example, the planning component 324 can determine a route to travel from a first location (e.g., a current location) to a second location (e.g., a target location). For the purpose of this discussion, a route can be a sequence of waypoints for travelling between two locations. As non-limiting examples, waypoints include streets, intersections, GPS coordinates, etc. Further, the planning component 324 can generate an instruction for guiding the autonomous vehicle along at least a portion of the route from the first location to the second location. In at least one example, the planning component 324 can determine how to guide the autonomous vehicle from a first waypoint in the sequence of waypoints to a second waypoint in the sequence of waypoints. In some examples, the instruction can be a trajectory, or a portion of a trajectory. In some examples, multiple trajectories can be substantially simultaneously generated (e.g., within technical tolerances) in accordance with a receding horizon technique. In the context of this disclosure, the planning component 324 can be used to induce motion of the vehicle 302. Although some examples involve inducing motion when the vehicle 302 is static, other implementations may use motion of the vehicle 302 to induce the motion. For instance, when the vehicle 302 does not include an active suspension, the planning component 324 can identify a trajectory or series of trajectories that will cause a desired induced motion. By way of non-limiting example, the planning component 324 can cause the vehicle 302 to swerve to induce a motion about a longitudinal axis of the vehicle. Also in examples, the planning component 324 can control the vehicle to hit obstacles, e.g., potholes, railroad tracks, or the like, at an appropriate speed and/or angle to induce the desired motion.

The system controller(s) 326, can be configured to control steering, propulsion, braking, safety, emitter, communication, and other systems of the vehicle 302. The system controller(s) 326 can communicate with and/or control corresponding systems of the drive module(s) 314 and/or other components of the vehicle 302.

The trajectory control system 328 can be an example of the system controller(s) 326 or a separate component. The trajectory control system 328 can determine a trajectory for the vehicle 302 that will cause excitation of the vehicle 302 about a number of degrees of freedom. As detailed herein, calibration of IMUs requires that motion be imparted with the vehicle 302, e.g., to induce rotation about one or both of a longitudinal axis and a lateral axis of the vehicle 302. The trajectory control system 328 can store one or more trajectories, paths, routes, or the like, that causes a desired motion.

In general, the IMU calibration system 330 can include functionality to determine whether one or more IMUs are properly calibrated. For instance, the IMU calibration system 330 may validate an external calibration of IMUs, e.g., relative to the vehicle. The IMU calibration system 330 can detect improperly calibrated IMUs, schedule calibration routines, and/or send calibration data to one or more other components of the vehicle 302 that utilize data produced by the sensor system(s) 306.

The first calibration model 334 may be the first calibration model 130 and/or the first model 222 discussed above. Specifically, the first calibration model 334 may implement one or more algorithms to determine an alignment of a first or primary IMU to the vehicle 302. The first calibration model 334 uses data from the sensor system(s) 306 other than the IMUs. For instance, the first calibration model 334 can implement a factor graph estimation to align IMU data with non-IMU sensor data, and therefore determine a relative position, e.g., rotation/translation of the IMU relative to a point or reference on the vehicle 302.

The second calibration model 334 may be the second calibration model 132 and/or the second model 236 discussed above. Specifically, the second calibration model 334 may implement one or more algorithms to determine a relative rotation or transformation of one or more additional IMUs relative to the first IMU. As described herein, the second calibration model 334 determines the transformation at the exclusion of non-IMU data. That is, the second calibration model 334 determines a transformation between a first IMU and a second IMU using only the first IMU data and the second IMU data.

The IMU calibration information 332 can include calibration data associated with the IMUs. In some instances, the sensor calibration information 332 can include one or more calibration angles (or calibration characteristics, generally) associated with an IMU. In some instances, IMU calibration information 332 can include mounting angles and/or positions of sensors and/or any extrinsic and/or intrinsic information associated with the one or more IMUs, including but not limited to, biases, calibration angles, mounting location, height, direction, yaw, tilt, pan, timing information, and the like. Further, the IMU calibration information 332 can include a log of some or all of the calibration operations performed, such as a time elapsed from the most recent calibration, and the like.

The error determination component 338 can include functionality to determine variations between information determined by the first calibration model 334 and/or the second calibration model 336 and expected data. For instance, the error detection component 338 can determine that a relative rotation of an IMU relative to a point or other reference on the vehicle 302 is within or outside a threshold relative rotation. Other systems and/or components of the vehicle 302 can use information generated by the error detection component 338. For instance, the perception component 322 can use information from the error detection component 338 to determine whether and which IMUs are providing reliable information.

Also in examples, the IMU calibration system 330 can use error information determined by the error detection component 338 to calibrate the sensor. For instance, the IMU calibration system 330 can minimize the error determined by the error detection component 338 and update the IMU calibration information 332 accordingly. Thus, the IMU calibration system 330 may include functionality to calibrate the IMUs in addition to functionality to verify that a sensor is functioning properly.

In some instances, aspects of some or all of the components discussed herein may include any models, algorithms, and/or machine learning algorithms. For example, in some instances, the components in the memory 318 (and memory 346, discussed below) may be implemented as a neural network.

As described herein, an exemplary neural network is a biologically inspired algorithm which passes input data through a series of connected layers to produce an output. Each layer in a neural network may also comprise another neural network or may comprise any number of layers (whether convolutional or not). As may be understood in the context of this disclosure, a neural network may utilize machine learning, which may refer to a broad class of such algorithms in which an output is generated based on learned parameters.

Although discussed in the context of neural networks, any type of machine learning may be used consistent with this disclosure. For example, machine learning algorithms may include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet50, ResNet101, VGG, DenseNet, PointNet, and the like.

In at least one example, the sensor system(s) 306 can be similar to the sensor system(s) 104 described above with reference to FIG. 1. The sensor system(s) 306 can include time-of-flight sensors, location sensors (e.g., GPS, compass, etc.), inertial sensors (e.g., inertial measurement units (IMUs), accelerometers, magnetometers, gyroscopes, etc.), LIDAR sensors, RADAR sensors, SONAR sensors, infrared sensors, cameras (e.g., RGB, IR, intensity, depth, etc.), microphone sensors, environmental sensors (e.g., temperature sensors, humidity sensors, light sensors, pressure sensors, etc.), ultrasonic transducers, wheel encoders, etc. The sensor system(s) 306 can include multiple instances of each of these or other types of sensors. For instance, instances of the same sensor modality may be located at the corners, front, back, sides, and/or top of the vehicle 302. As another example, the camera sensors can include multiple cameras disposed at various locations about the exterior and/or interior of the vehicle 302.

The sensor system(s) 306 can generate sensor data and provide such data to the vehicle computing device 304. For instance, aspects of this disclosure relate to calibrating IMUs, which are some of the sensor system(s) 306. For instance, the first calibration model 334 can use data from an IMU (e.g., a first or primary IMU) and from an additional sensor modality (e.g., LiDAR sensor, image sensor, or the like). Moreover, the second calibration model 336 receives IMU data from a plurality of IMUs. Additionally, or alternatively, the sensor system(s) 306 can send sensor data, via one or more networks 340, to the one or more computing device(s) at a particular frequency, after a lapse of a predetermined period of time, in near real-time, etc.

The emitter(s) 308 can emit light and/or sound. In the illustrated example, the emitter(s) 308 can include interior audio and visual emitters to communicate with passengers of the vehicle 302. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 308 can also include exterior emitters. By way of example and not limitation, some example exterior emitters may include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The communication connection(s) 310 enable communication between the vehicle 302 and one or more other local or remote computing device(s). For instance, the communication connection(s) 310 can facilitate communication with other local computing device(s) on the vehicle 302 and/or the drive module(s) 314. Also, the communication connection(s) 310 can allow the vehicle to communicate with other nearby computing device(s) (e.g., other nearby vehicles, traffic signals, etc.). The communication connection(s) 310 also enable the vehicle 302 to communicate with a remote teleoperations computing device or other remote services.

The communication connection(s) 310 can include physical and/or logical interfaces for connecting the vehicle computing device 304 to another computing device or a network, such as the network(s) 340. For example, the communication connection(s) 310 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In some examples, the drive module(s) 314 can include a single drive module. In other examples, the vehicle 302 can have multiple drive modules, and individual of the drive module(s) 314 can be positioned on opposite ends of the vehicle 302 (e.g., the front and the rear, etc.). In at least one example, the drive module(s) 314 can include one or more sensor systems to detect conditions of the drive module(s) 314 and/or the surroundings of the vehicle 302. By way of example and not limitation, the sensor system(s) can include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, LiDAR sensors, RADAR sensors, etc. Some sensors, such as the wheel encoders can be unique to the drive module(s) 314. In some cases, the sensor system(s) on the drive module(s) 314 can overlap or supplement corresponding systems of the vehicle 302 (e.g., the sensor system(s) 306).

The drive module(s) 314 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive module(s) 314 can include a drive module controller which can receive and preprocess data from the sensor system(s) and to control operation of the various vehicle systems. In some examples, the drive module controller can include one or more processors and memory communicatively coupled with the one or more processors. The memory can store one or more modules to perform various functionalities of the drive module(s) 314. Furthermore, the drive module(s) 314 also include one or more communication connection(s) that enable communication by the respective drive module with one or more other local or remote computing device(s).

The processor(s) 316 of the vehicle 302 can be any suitable processor capable of executing instructions to process data and perform operations as described herein. By way of example and not limitation, the processor(s) 316 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

The memory 318 is an example of non-transitory computer-readable media. The memory 318 can store an operating system and one or more software applications, instructions, programs, and/or data to implement the methods described herein and the functions attributed to the various systems. In various implementations, the memory can be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

It should be noted that while FIG. 3 is illustrated as a distributed system, in alternative examples, components of the vehicle 302 can be associated with remote computing devices accessible via one or more networks 340.

For example, the vehicle 302 can send sensor data to one or more computing device(s) 342 via the network(s) 340. In some examples, the vehicle 302 can send raw sensor data to the computing device(s) 342. In other examples, the vehicle 302 can send processed sensor data and/or representations of sensor data to the computing device(s) 342. In some examples, the vehicle 302 can send sensor data to the computing device(s) 342 at a particular frequency, after a lapse of a predetermined period of time, in near real-time, etc. In some cases, the vehicle 302 can send sensor data (raw or processed) to the computing device(s) 342 as one or more log files.

The computing device(s) 342 can receive the sensor data (raw or processed) and can perform calibration operations on the data. In at least one example, the computing device(s) 342 can include one or more processors 344 and memory 346 communicatively coupled with the one or more processors 344. In the illustrated example, the memory 346 of the computing device(s) 342 stores an IMU calibration system 348, which can include functionality to perform operations similar to those discussed above in the context of the IMU calibration system 330. In some instances, the processor(s) 344 and the memory 346 can include functionality and/or structure similar to that discussed above with respect to the processor(s) 316 and the memory 318.

Figure 4:
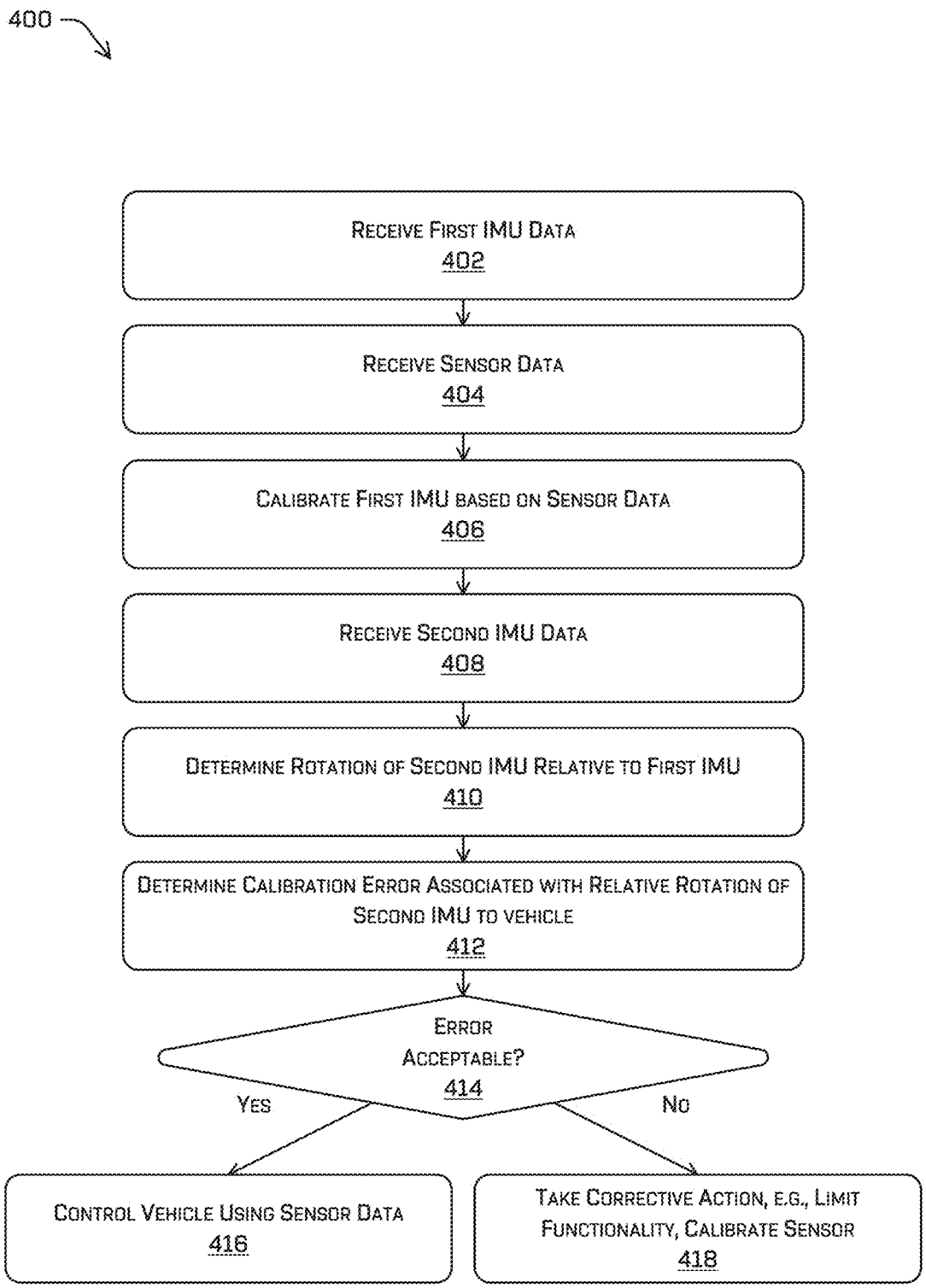
FIG. 4 is an example process for determining calibration errors using induced motion, in accordance with implementations described herein.
Figure 5:
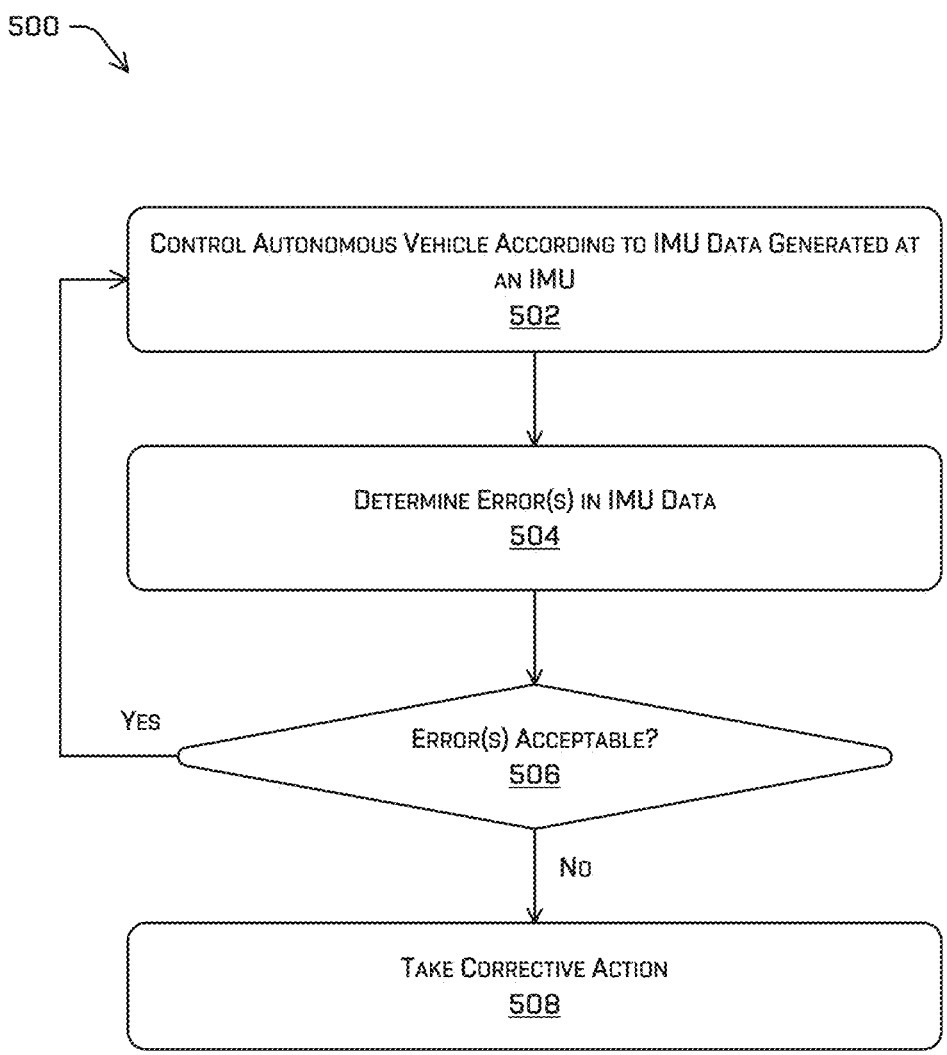
FIG. 5 is an example process for calibrating extrinsic characteristics of sensors, in accordance with implementations described herein.

FIGS. 2, 4, and 5 illustrate example processes in accordance with embodiments of the disclosure. These processes are illustrated as logical flow graphs, with each operation representing a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

FIG. 4 depicts an example process 400 for calibrating extrinsic characteristics of IMUs. For example, some or all of the process 400 can be performed by one or more components in FIG. 3, as described herein. Without limitation, portions of the process 400 can be performed by the IMU calibration system 330 and/or the IMU calibration system 348.

At operation 402, the process 400 includes receiving first IMU data. In some examples, a vehicle or other system may include a plurality of IMUs including gyroscopes, accelerometers, magnetometers, or the like. The operation 402 includes receiving data from one of the IMUs, e.g., a primary IMU, associated with a period of time. In examples, the first IMU data may be associated with movement of the vehicle that excites the vehicle about a number of degrees of freedom. In some instances, the vehicle may be controlled according to a predetermined trajectory or route to induce a desired response, e.g., roll, pitch, yaw, at the vehicle. The first IMU data can include log data, e.g., for some predetermined amount of time. In other examples, portions of a data log may be selected, e.g., portions associated with a desired motion of the vehicle.

At operation 404, the process 400 receiving sensor data. As described herein, a vehicle or other system can include a number of sensors, e.g., in addition to IMUs. The operation 404 includes receiving data from such additional sensor(s). The sensor data can include, without limitation, LiDAR data, radar data, image data, or other data. The sensor data received at the operation 404 corresponds, e.g., in time, to the first IMU data received at the operation 402.

At operation 406, the process 400 calibrating the first IMU based on the sensor data. As noted above, the first IMU may correspond to a primary IMU, which may be calibrated relative to the sensor data received at the operation 404. In examples, the operation 406 can include implementing the first calibration model 334 to determine a rotation (and/or translation) of the first IMU relative to the vehicle. For example, the operation 406 can include determining the first rotational representation 224.

At operation 408, the process 400 includes receiving second IMU data. As with the first IMU data received at the operation 402, the second IMU data can include one or more of rotational and/or translation information about the vehicle. The second IMU data corresponds in time with the first IMU data. For example, the first IMU data and the second IMU data can include timestamp information that allows for identifying data associated with the same times, and thus representative of the same motion detected at the vehicle.

At operation 410, the process 400 includes determining a rotation of the second IMU relative to the first IMU. For example, the operation 410 can include implementing a model, such as the second calibration model 336, to determine the second rotational representation 238. Without limitation, the second calibration model 336 may use the Equation (1), discussed above, to determine the second rotational representation 238. As will be appreciated, the operation 410 uses only the first IMU data and the second IMU data, e.g., without the sensor data, to determine a transformation between the first IMU and the second IMU.

At operation 412, the process 400 includes determining a calibration error associated with a relative rotation of the second IMU relative to the vehicle. The operation 406 determines a transformation between the first IMU and the vehicle and the operation 410 determines a transformation between the second IMU and the first IMU. The operation 412 can determine a transformation between the second IMU and the vehicle, e.g., using Equation (2) discussed above. The operation 412 can also include determining an error associated with the transformation between the second IMU and the vehicle. For instance, the operation 412 can determine whether the calibration of the second IMU is within a threshold metric, e.g., within one or more threshold distance(s) and/or angle(s) of a reference on the vehicle. Stated differently, the operation 412 can determine a variation between the measured pose of the second IMU, relative to the vehicle, and data expected based on the specifications of the vehicle.

At operation 414, the process 400 can include determining whether the calibration error is acceptable. For example, the calibration error determined at the operation 412 may be compared to a threshold calibration error. The threshold calibration error can be based on positional and/or rotational specifications and tolerances associated with the vehicle, manufacturing tolerances associated with the sensor and/or IMUs, and/or other data, including but not limited to the IMU calibration information 332 discussed above.

If, at operation 414, it is determined that the calibration error is equal to or less than a threshold error, i.e., that the error is acceptable, at operation 416 the process 400 can include controlling the vehicle using the sensor data. Thus, for example, the process 400 can serve as a verification that the sensor(s) continue to be properly calibrated, e.g., within a predetermined threshold.

Alternatively, if, at operation 414 it is determined that the calibration error is equal to or greater than a threshold error, i.e., that the error is not acceptable, at operation 418 the process 400 can include taking a corrective action. In some examples, the corrective action may include discontinuing reliance on the IMU data until the IMU can be re-calibrated. For example, only data from a subset of the IMUs, such as a single IMU, may be used for future control processes. In still further examples, the corrective action may include weighting or otherwise prioritizing data from the IMUs based on the error. For instance, and without limitation, data from the IMU(s) concluded to be properly calibrated can be more heavily weighted than data from an IMU that is determined to be out of alignment. In other implementations, for example, in instances in which the discontinuing use of the IMU data would result in unsafe operation of the vehicle, the corrective action may include taking the vehicle out of service, prohibiting navigation with the vehicle, inhibiting some or all functionality (e.g., inhibiting subsystems, certain types or directions of navigation, travel above a certain speed, or the like), and/or requesting assistance for navigation. In still other examples, the corrective action may include determining updated calibration information and calibrating subsequent IMU data in accordance with the updated calibration information. For example, techniques described herein may determine a calibration function that minimizes the calibration error determined at the operation 412. In some examples, the calibration function may be determined over several iterations of the IMU data, e.g., over a period of time or number of returns, and/or based on other data, including data from other sensors, semantic segmentation information, or the like. For example, the operation 418 can include sending the calibration function to one or more of a localization system (e.g., the localization component 320), a perception system (e.g., the perception component 322), and the like. In some instances, the calibration function can be used by one or more systems of the vehicle to align or otherwise adjust data captured by the IMUs so that the data can represent aspects of the vehicle in a more accurate manner. Thus, for example, while techniques described herein can be used to validate IMU data, e.g., by determining that a calibration error is within a threshold error, techniques described herein may also be used to calibrate IMU data, e.g., when a calibration error indicates that the sensor is no longer properly calibrated.

In the example of FIG. 4, only a second IMU is calibrated relative to a first IMU. In implementations, however, the operations 408-414 can be performed for any additional IMUs on the vehicle. Without limitation, the operations 408-414 can be performed serially or in parallel, e.g., by comparing one or more additional IMUs to the first IMU to determine, individually, a calibration error. In other examples, a single optimization may be used for the second IMU as well as any additional IMU(s). Using a single optimization to determine calibration of multiple secondary IMUs according to techniques described herein can be performed quickly and with minimal processing requirements.

FIG. 5 depicts an example process 500 for controlling an autonomous vehicle based at least in part on calibrated IMU data, as discussed herein. For example, some or all of the process 500 can be performed by one or more components in FIG. 3, as described herein. For example, some or all of the process 500 can be performed by the localization component 320, the perception component 322, the planning component 324, and/or the system controller(s) 326.

At operation 502, the process 500 can include controlling an autonomous vehicle according to IMU data generated by an IMU on the vehicle. As described herein, an autonomous vehicle, such as the vehicle 102, the vehicle 206, or the vehicle 302, may include a plurality of IMUs. Various components, including the localization component 320, the perception component 322, the planning component 324, and/or the system controller(s) 326 may rely on the IMU data to determine and execute drive instructions, e.g., trajectories, for the vehicle 302. By way of non-limiting example, the controls for the vehicle can be based on a pose of the vehicle determine using the IMU data.

At operation 504, the process 500 can include determining errors in IMU data. For example, the operation 504 can include the processes 200 and/or 400 discussed above, in which secondary IMUs are calibrated relative to a vehicle by determining, using a first model, a transformation describing a relationship between a first IMU and the vehicle and, using a second model, a transformation describing a relationship between a second IMU and the first IMU. Use of the second model greatly reduces the time and memory required to calibrate IMUs on the vehicle.

At operation 506, the process 500 can determine whether the errors determined at the operation 504 are acceptable. By way of non-limiting example, the errors may be acceptable when measured differences of the position and/or rotation comport with an expected measurement within a threshold error. If, at the operation 506, it is determined that the errors are acceptable, processing returns to the operation 502, and the vehicle continues to be controlled according to the IMU data, e.g., because the IMU calibration has been validated within a threshold error.

However, if, at the operation 506, it is determined that the errors are not acceptable, at operation 508, the process 500 can include taking a corrective action. In some examples, the corrective action may include discontinuing reliance on the IMU data until the IMU can be re-calibrated. In other implementations, for example, in instances in which the discontinuing use of the IMU data would result in unsafe operation of the vehicle, the corrective action may include taking the vehicle out of service and/or requesting assistance to navigate the vehicle. In still other examples, the corrective action may include determining updated calibration information and calibrating subsequent IMU data in accordance with the updated calibration information. Still further examples of corrective actions can include navigating the vehicle without reliance on the misaligned IMU, weighting the IMU data based on the error, and/or other actions like those described above.

As will be appreciated, according to the process 500, sensor calibration validation can be performed in real-time or at near real-time. Accordingly, the vehicle can take corrective action in real-time or near real-time, thereby increasing operation safety of the vehicle, among other benefits.

EXAMPLE CLAUSES

A: A vehicle includes: a first inertial measurement unit; a second inertial measurement unit fixed relative to the first inertial measurement unit; a sensor mounted on the vehicle and configured to generate sensor data; one or more processors; and memory storing instructions executable by the one or more processors to cause the vehicle to perform acts comprising: receiving, from the first inertial measurement unit, a first angular velocity; receiving, from the sensor, sensor data; determining, based at least in part on a first technique, a first calibration of the first inertial measurement unit relative to the vehicle based at least in part on the first angular velocity and the sensor data; receiving, from the second inertial measurement unit, a second angular velocity; determining, based at least in part on a second technique, a relative rotation of the second inertial measurement unit relative to the first inertial measurement unit based at least in part on the first angular velocity and the second angular velocity; determining a second calibration of the second inertial measurement unit relative to the vehicle based at least in part on the relative rotation and a bias between the first inertial measurement unit and the second inertial measurement unit; and controlling, based at least in part on the first calibration or the second calibration, the vehicle based at least in part on data from the first inertial measurement unit or data from the second inertial measurement unit.

B: The vehicle of example A, wherein the second technique comprises determining a rotation matrix that minimizes the sum of squared deviation between data of the first inertial measurement unit and data of the second inertial measurement unit.

C: The vehicle of example A or example B, wherein the acts further comprise: determining, based at least in part on the second calibration, an error associated with the second inertial measurement unit.

D: The vehicle of any one of example A through example C, wherein the acts further comprise: determining that the error exceeds a threshold error, wherein the controlling the vehicle comprises one of: controlling the vehicle at the exclusion of the data from the second inertial measurement unit; generating first weighted data based on a first weighting factor and the data from the first inertial measurement unit, generating second weighted data based on a second weighting factor and the data from the second inertial measurement unit, and controlling the vehicle based on the first weighted data and the second weighted data; limiting functionality of the vehicle; or requesting remote assistance for navigating the vehicle.

E: The vehicle of any one of example A through example D, further comprising: receiving a first linear acceleration from a first accelerometer associated with the first inertial measurement unit; receiving a second linear acceleration from a second accelerometer associated with the second inertial measurement unit; and determining a relative translation between the second IMU and the first IMU based at least in part on the first linear acceleration and the second linear acceleration.

F: An example method includes: receiving, from a first inertial measurement unit coupled to a system, first rotational velocity information; calibrating, based at least in part on the first rotational velocity information and using a first technique, the first inertial measurement unit relative to the system; receiving, from a second inertial measurement unit fixed relative to the first inertial measurement unit, second rotational velocity information; and calibrating, using a second technique that determines a relative rotation of the second inertial measurement unit relative to the first inertial measurement unit, the second inertial measurement unit relative to the reference.

G: The method of example F, wherein the calibrating the first inertial measurement unit relative to the reference comprises: receiving sensor data from a sensor coupled to the system, wherein the calibrating the first inertial measurement unit comprises comparing the first rotational velocity to the sensor data.

H: The method of example F or example G, wherein: the calibrating the first inertial measurement unit comprises determining a transformation representative of a position of the first inertial measurement unit relative to the system; and the calibrating the second inertial measurement unit comprises determining a product of the transformation and the relative rotation of the second inertial measurement unit relative to the second inertial measurement unit.

I: The method of any one of example F through example H, wherein the sensor comprises one or more of a LiDAR sensor, a radar sensor, or an imaging sensor.

J: The method of any one of example F through example I, wherein the second technique aligns the first angular velocity with the second angular velocity to determine a rotation matrix based at least in part on a least-squares optimization.

K: The method of any one of example F through example J, wherein the second technique aligns the first angular velocity with the second angular velocity to determine a rotation matrix that minimizes the sum of squared deviation between data of the first inertial measurement unit and data of the second inertial measurement unit.

L: The method of any one of example F through example K, further comprising: receiving, from a third inertial measurement unit fixed relative to the first inertial measurement unit and the second inertial measurement unit, third rotational velocity information; and calibrating, using the second technique, the third inertial measurement unit relative to the reference.

M: The method of any one of example F through example L, wherein the calibrating the second inertial measurement unit relative to the reference and the calibrating the third inertial measurement unit relative to the reference comprises performing a joint optimization.

N: The method of any one of example F through example M, further comprising exciting the system to induce movement of the system about a plurality of degrees of freedom.

O: The method of any one of example F through example N, wherein the system comprises a vehicle and the exciting the system comprises controlling the vehicle to induce rotational motion corresponding to one or more of a roll, pitch, or yaw of the vehicle.

P: The method of any one of example F through example O, wherein the system comprises a vehicle, the method further comprising: determining a calibration error between the first inertial measurement unit and the second inertial measurement unit; and implementing a corrective action at the vehicle based at least in part on the calibration error meeting or exceeding a threshold calibration error.

Q: The method of any one of example F through example P, wherein the corrective action comprising one or more of: controlling the vehicle at the exclusion of the data from the second inertial measurement unit; generating first weighted data based on a first weighting factor and the data from the first inertial measurement unit, generating second weighted data based on a second weighting factor and the data from the second inertial measurement unit, and controlling the vehicle based on the first weighted data and the second weighted data; limiting functionality of the vehicle; or requesting remote assistance for navigating the vehicle.

R: An example system includes: a first inertial measurement unit a second inertial measurement unit fixed relative to the first inertial measurement unit; one or more processors; and memory storing instructions executable by the one or more processors to cause the vehicle to perform acts comprising: receiving, from a first inertial measurement unit coupled to a system, a first rotational velocity information; calibrating, based at least in part on the first rotational velocity information and using a first technique, the first inertial measurement unit relative to the system; receiving, from a second inertial measurement unit fixed relative to the first inertial measurement unit, a second rotational velocity information; and calibrating, using a second technique that determines a relative rotation of the second inertial measurement unit relative to the first inertial measurement unit, the second inertial measurement unit relative to the reference.

S: The system of example R, further comprising a sensor comprising at least one of a radar sensor, a lidar sensor, or an image sensor, the acts further comprising: receiving sensor data from the sensor, wherein the calibrating the first inertial measurement unit comprises comparing the first rotational velocity to the sensor data.

T: The system of example R or example S, the acts further comprising: receiving, from a third inertial measurement unit fixed relative to the first inertial measurement unit and the second inertial measurement unit, third rotational velocity information; and calibrating, using the second technique, the third inertial measurement unit relative to the reference.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations described herein need not be performed in the order disclosed, and other examples using alternative orderings of the computations could be readily implemented. In addition to being reordered, in some instances, the computations could also be decomposed into sub-computations with the same results.

What is claimed is:

1. A vehicle comprising:
a first inertial measurement unit;
a second inertial measurement unit fixed relative to the first inertial measurement unit;
a sensor mounted on the vehicle and configured to generate sensor data;
one or more processors; and
memory storing instructions executable by the one or more processors to cause the vehicle to perform acts comprising:
receiving, from the first inertial measurement unit, a first angular velocity;
receiving, from the sensor, sensor data;
determining, based at least in part on a first technique, a first calibration of the first inertial measurement unit relative to the vehicle based at least in part on the first angular velocity and the sensor data;
receiving, from the second inertial measurement unit, a second angular velocity;
determining, based at least in part on a second technique, a relative rotation of the second inertial measurement unit relative to the first inertial measurement unit based at least in part on the first angular velocity and the second angular velocity;
determining a second calibration of the second inertial measurement unit relative to the vehicle based at least in part on the relative rotation and a bias between the first inertial measurement unit and the second inertial measurement unit; and
controlling, based at least in part on the first calibration or the second calibration, the vehicle based at least in part on data from the first inertial measurement unit or data from the second inertial measurement unit.

2. The vehicle of claim 1, wherein the second technique comprises determining a rotation matrix that minimizes the sum of squared deviation between data of the first inertial measurement unit and data of the second inertial measurement unit.

3. The vehicle of claim 1, wherein the acts further comprise:
determining, based at least in part on the second calibration, an error associated with the second inertial measurement unit.

4. The vehicle of claim 3, wherein the acts further comprise:
determining that the error exceeds a threshold error,
wherein the controlling the vehicle comprises one of:
controlling the vehicle at the exclusion of the data from the second inertial measurement unit;
generating first weighted data based on a first weighting factor and the data from the first inertial measurement unit, generating second weighted data based on a second weighting factor and the data from the second inertial measurement unit, and controlling the vehicle based on the first weighted data and the second weighted data;
limiting functionality of the vehicle; or
requesting remote assistance for navigating the vehicle.

5. The vehicle of claim 1, further comprising:
receiving a first linear acceleration from a first accelerometer associated with the first inertial measurement unit;
receiving a second linear acceleration from a second accelerometer associated with the second inertial measurement unit; and
determining a relative translation between the second IMU and the first IMU based at least in part on the first linear acceleration and the second linear acceleration.

6. A method comprising:
receiving, from a first inertial measurement unit coupled to a system, first rotational velocity information;
calibrating, based at least in part on the first rotational velocity information and using a first technique, the first inertial measurement unit relative to the system;

receiving, from a second inertial measurement unit fixed relative to the first inertial measurement unit, second rotational velocity information; and calibrating, using a second technique that determines a relative rotation of the second inertial measurement unit relative to the first inertial measurement unit, the second inertial measurement unit relative to the reference.

7. The method of claim 6, wherein the calibrating the first inertial measurement unit relative to the reference comprises:

receiving sensor data from a sensor coupled to the system, wherein the calibrating the first inertial measurement unit comprises comparing the first rotational velocity to the sensor data.

8. The method of claim 7, wherein:

the calibrating the first inertial measurement unit comprises determining a transformation representative of a position of the first inertial measurement unit relative to the system; and the calibrating the second inertial measurement unit comprises determining a product of the transformation and the relative rotation of the second inertial measurement unit relative to the second inertial measurement unit.

9. The method of claim 7, wherein the sensor comprises one or more of a LiDAR sensor, a radar sensor, or an imaging sensor.

10. The method of claim 9, wherein the second technique aligns the first angular velocity with the second angular velocity to determine a rotation matrix based at least in part on a least-squares optimization.

11. The method of claim 9, wherein the second technique aligns the first angular velocity with the second angular velocity to determine a rotation matrix that minimizes the sum of squared deviation between data of the first inertial measurement unit and data of the second inertial measurement unit.

12. The method of claim 6, further comprising:

receiving, from a third inertial measurement unit fixed relative to the first inertial measurement unit and the second inertial measurement unit, third rotational velocity information; and calibrating, using the second technique, the third inertial measurement unit relative to the reference.

13. The method of claim 12, wherein the calibrating the second inertial measurement unit relative to the reference and the calibrating the third inertial measurement unit relative to the reference comprises performing a joint optimization.

14. The method of claim 6, further comprising exciting the system to induce movement of the system about a plurality of degrees of freedom.

15. The method of claim 14, wherein the system comprises a vehicle and the exciting the system comprises controlling the vehicle to induce rotational motion corresponding to one or more of a roll, pitch, or yaw of the vehicle.

16. The method of claim 6, wherein the system comprises a vehicle, the method further comprising:

determining a calibration error between the first inertial measurement unit and the second inertial measurement unit; and implementing a corrective action at the vehicle based at least in part on the calibration error meeting or exceeding a threshold calibration error.

17. The method of claim 16, wherein the corrective action comprising one or more of:

controlling the vehicle at the exclusion of the data from the second inertial measurement unit;

generating first weighted data based on a first weighting factor and the data from the first inertial measurement unit, generating second weighted data based on a second weighting factor and the data from the second inertial measurement unit, and controlling the vehicle based on the first weighted data and the second weighted data;

limiting functionality of the vehicle; or requesting remote assistance for navigating the vehicle.

18. A system comprising:

a first inertial measurement unit a second inertial measurement unit fixed relative to the first inertial measurement unit;

one or more processors; and memory storing instructions executable by the one or more processors to cause the vehicle to perform acts comprising:

receiving, from a first inertial measurement unit coupled to a system, a first rotational velocity information;

calibrating, based at least in part on the first rotational velocity information and using a first technique, the first inertial measurement unit relative to the system;

receiving, from a second inertial measurement unit fixed relative to the first inertial measurement unit, a second rotational velocity information; and calibrating, using a second technique that determines a relative rotation of the second inertial measurement unit relative to the first inertial measurement unit, the second inertial measurement unit relative to the reference.

19. The system of claim 18, further comprising a sensor comprising at least one of a radar sensor, a lidar sensor, or an image sensor, the acts further comprising:

receiving sensor data from the sensor, wherein the calibrating the first inertial measurement unit comprises comparing the first rotational velocity to the sensor data.

20. The system of claim 18, the acts further comprising:

receiving, from a third inertial measurement unit fixed relative to the first inertial measurement unit and the second inertial measurement unit, third rotational velocity information; and calibrating, using the second technique, the third inertial measurement unit relative to the reference.

* * * * *